(12) United States Patent
Thomas et al.

(10) Patent No.: US 8,015,819 B2
(45) Date of Patent: Sep. 13, 2011

(54) WET ACTIVE CHEVRON NOZZLE FOR CONTROLLABLE JET NOISE REDUCTION

(75) Inventors: Russell H. Thomas, Yorktown, VA (US); Kevin W. Kinzie, Moore, SC (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 719 days.

(21) Appl. No.: 11/536,790

(22) Filed: Sep. 29, 2006

(65) Prior Publication Data

US 2008/0078159 A1   Apr. 3, 2008

(51) Int. Cl.
*F02K 1/00* (2006.01)

(52) U.S. Cl. ........ 60/770; 239/265.39; 60/39.5; 60/231; 181/213

(58) Field of Classification Search ............ 60/770, 60/39.5, 771, 264, 231; 181/213, 220; 239/265.17, 239/265.19, 265.39
See application file for complete search history.

(56) References Cited

U.S. PATENT DOCUMENTS

| | | | |
|---|---|---|---|
| 2,927,423 A * | 3/1960 | Wisniowski | 60/765 |
| 2,959,917 A | 11/1960 | McGehee | |
| 3,091,924 A * | 6/1963 | Wilder, Jr. | 60/231 |
| 3,227,240 A | 1/1966 | Lee et al. | |
| 3,343,629 A | 9/1967 | Sanders | |
| 3,442,350 A | 5/1969 | O'Brien | |
| 3,641,766 A * | 2/1972 | Uehling | 60/262 |
| 3,684,054 A * | 8/1972 | Lemmerman | 181/203 |
| 3,782,116 A | 1/1974 | Burge et al. | |
| 3,815,356 A | 6/1974 | Burge et al. | |
| 3,839,846 A | 10/1974 | Teller | |
| 3,899,923 A | 8/1975 | Teller | |
| 3,979,065 A * | 9/1976 | Madden | 239/127.3 |
| 4,168,763 A | 9/1979 | White et al. | |
| 4,630,683 A * | 12/1986 | Allan | 169/45 |
| 5,092,425 A * | 3/1992 | Shaw, Jr. | 181/213 |
| 5,404,713 A * | 4/1995 | Johnson | 60/204 |
| 5,428,954 A * | 7/1995 | Cowan, Sr. | 60/262 |
| 5,450,720 A * | 9/1995 | Vuillamy et al. | 60/770 |
| 5,706,651 A | 1/1998 | Lillibridge et al. | |
| 6,092,621 A | 7/2000 | Kinzie | |
| 6,112,512 A * | 9/2000 | Miller et al. | 60/204 |
| 6,112,513 A * | 9/2000 | Catt et al. | 60/204 |
| 6,301,877 B1 * | 10/2001 | Liang et al. | 60/226.1 |
| 6,308,898 B1 * | 10/2001 | Dorris et al. | 239/265.17 |
| 6,314,721 B1 * | 11/2001 | Mathews et al. | 60/264 |
| 6,336,319 B1 * | 1/2002 | Koshoffer | 60/770 |
| 6,360,528 B1 * | 3/2002 | Brausch et al. | 60/262 |
| 6,487,848 B2 * | 12/2002 | Zysman et al. | 60/262 |
| 6,612,106 B2 | 9/2003 | Balzer | |
| 6,640,537 B2 | 11/2003 | Tse | |
| 6,658,839 B2 * | 12/2003 | Hebert | 60/204 |
| 6,662,546 B1 * | 12/2003 | Giffin, III | 60/39.5 |

(Continued)

Primary Examiner — William Rodriguez
(74) Attorney, Agent, or Firm — Robin W. Edwards; Helen M. Galus

(57) ABSTRACT

Disposed at or toward the trailing edge of one or more nozzles associated with a jet engine are injection ports which can selectively be made to discharge a water stream into a nozzle flow stream for the purpose of increasing turbulence in somewhat of a similar fashion as mechanically disposed chevrons have done in the known art. Unlike mechanically disposed chevrons of the known art, the fluid flow may be secured thereby increasing the engine efficiency. Various flow patterns, water pressures, orifice designs or other factors can be made operative to provide desired performance characteristics.

23 Claims, 3 Drawing Sheets

U.S. PATENT DOCUMENTS

| | | | |
|---|---|---|---|
| 6,826,901 B2* | 12/2004 | Hebert | 60/204 |
| 7,055,329 B2* | 6/2006 | Martens et al. | 60/772 |
| 7,093,423 B2* | 8/2006 | Gowda et al. | 60/204 |
| 7,159,383 B2* | 1/2007 | Barton et al. | 60/226.1 |
| 7,174,704 B2* | 2/2007 | Renggli | 60/204 |
| 7,174,718 B2* | 2/2007 | Bonnet et al. | 60/770 |
| 7,246,481 B2* | 7/2007 | Gutmark et al. | 60/204 |
| 7,412,832 B2* | 8/2008 | Gutmark et al. | 60/770 |
| 7,543,452 B2* | 6/2009 | Reba et al. | 60/770 |
| 2002/0121090 A1* | 9/2002 | Zysman et al. | 60/770 |
| 2002/0125340 A1* | 9/2002 | Birch et al. | 239/265.11 |
| 2003/0145577 A1* | 8/2003 | Hunter et al. | 60/231 |
| 2004/0079072 A1* | 4/2004 | Shumate | 60/204 |
| 2004/0088967 A1* | 5/2004 | Webster et al. | 60/204 |
| 2005/0144935 A1 | 7/2005 | Gupta | |
| 2005/0193716 A1 | 9/2005 | Schlinker et al. | |
| 2005/0214107 A1* | 9/2005 | Gutmark et al. | 415/1 |
| 2009/0072047 A1* | 3/2009 | Greene | 239/127.3 |

* cited by examiner

WET ACTIVE CHEVRON NOZZLE FOR CONTROLLABLE JET NOISE REDUCTION

ORIGIN OF THE INVENTION

This invention was made by employees of the United States Government and may be manufactured and used by or for the Government for governmental purposes without the payment of any royalties thereon or thereof.

FIELD OF THE INVENTION

The present invention relates to methods and devices for reducing the jet noise component of aircraft engine noise, and more preferably to an improved selectively activated and controlled injection system which can be activated so as to reduce noise during high noise operations, such as at takeoff, and can be de-activated for maximum cruise performance, or other purposes.

DESCRIPTION OF RELATED ART

Aircraft generated noise has had a negative impact on the general public. This negative impact has at times constrained the growth of the air transport system due to the objections frequently raised when the construction of a new airport is proposed. This constraint on growth contributes to congestion at the existing airports. The jet noise component of aircraft engine noise continues to be a significant source of noise even on recent high bypass ratio engine designs.

When designing aircraft, performance, maintenance and cost of use place stringent requirements on systems and modifications made to engines. Therefore, devices and methods for noise control are typically subjected to these same constraints. This is believed to have resulted in relatively few jet noise reduction devices and methods implemented in recent years.

One known jet noise reduction device which has been successfully developed and implemented on some commercial aircraft is the mechanically fixed chevron. In general, chevrons are applied to the trailing edge of engine nozzles and give the appearance of a sawtooth, with the tips being immersed into the flow stream to create streamwise vorticity. Selectable parameters of chevrons include the number of chevrons around the circumference of a nozzle, the amount of penetration of the tip into the flow, and the exact shape and size of the chevron.

Conventional fixed chevrons are normally part of the nozzle trailing edge construction and their shape cannot be altered in flight. Therefore, the chevron shape, size and positioning (i.e., degree of penetration into the flow stream) are normally optimized for noise reduction at takeoff, however, this chevron design typically results in a corresponding negative result by causing excess drag during cruise. The fixed chevron has been found to reduce noise by mixing the outer flow with inner flow, by creating properly scaled streamwise (longitudinal) vorticity, thereby reducing radiated noise. In the research that has been done in recent years, fixed chevrons have typically been capable of jet noise reduction on the order of 2-3 EPNdB (Effective Perceived Noise in decibels) depending on bypass ratio and other significant parameters.

Another noise reduction technique that has been previously studied, but apparently never implemented for flight applications, was water injection into the jet exhaust plume. Water injected into the exhaust plume could potentially reduce noise levels over a large spatial distribution and relatively wide frequency ranges. As the water droplets evaporate and are dispersed through the plume, at least two purposes are served: a reduction in gas temperature caused by latent heat effects; and an attenuation of turbulent kinetic and thermal energies. These two effects were found to reduce pressure and temperature fluctuations in the noise-producing region of the jet.

Therefore, while the known art has included efforts to use water injection into jet plumes to reduce noise, nevertheless, no effort is known by the applicant to use the momentum of water jets to also emulate the effects of fixed chevrons.

Accordingly, an improved method of noise reduction is believed to be advantageous and necessary.

SUMMARY OF THE INVENTION

It is an object of the present invention to provide an improved noise reduction device and method of its use with jet engines.

It is another object of the present invention to provide an improved method of reducing noise utilizing fluid injection at least partially into a flow path from the nozzle surface.

It is another object of the present invention to provide an improved method of reducing noise by utilizing a method and device for injecting fluid, such as water, in a controlled manner so that the introduction or ceasing of the fluid input can be controlled under various circumstances.

It is yet another object of the present invention to provide a noise reduction system that can be secured and/or reduced at times to increase the efficiency of an aircraft engine, and thus help the aircraft achieve its maximum performance.

Other objects and advantages of the present invention will become more obvious hereinafter in the specification and drawings.

Accordingly, a fluid injection system is disposed toward the trailing edge of nozzles and configured to selectively inject fluid to penetrate into the flow so as to provide a selectively activateable chevron or extension there from. The momentum from water can simulate the effect of chevrons while providing the additional perceived benefit that water atomization can also contribute to additional noise suppression.

In at least one embodiment of the present invention, small injection ports disposed towards the trailing edge of nozzles can be selectively activated to inject water into the jet flow(s). Injection ports are preferably at least substantially circumferentially disposed about the nozzle. They can be sized, oriented and/or shaped to produce similar or different deflections into flow streams, as compared to deflections created by known fixed chevrons.

Additionally, as will be explained in more detail herein, it is within the scope of the present invention to utilize these injection ports on nozzles both with, or without, fixed chevrons. However, on a nozzle having fixed chevrons (i.e., a chevron nozzle), by using the water injection during aircraft takeoff to generate axial vorticity and thereby mix the fan and core streams (or the fan and free stream flows), the water augments the mixing from the fixed chevrons (resulting in what can be termed a "wet chevron") such that a lower penetration fixed chevron can be used and therefore a correspondingly reduced cruise thrust performance loss can be realized.

In at least this embodiment, small water jets at low pressures have been found sufficient to produce the type of water penetration into the flow needed to substantially duplicate the penetration of the conventional known chevron. These water jets can be used either in combination with a fixed chevron (a "wet chevron"), or used alone on a jet nozzle without chevrons (a "water chevron"). Optimization of this technique can be perfected through variables such as water injection angles, injection port shapes, water mass flow, injection port distribution, etc.

As an added benefit, introducing fluid into the flow can produce additional noise suppression by mixing with the jet plume downstream and reducing turbulent and temperature fluctuations that can cause far-field noise radiation. An additional benefit of introducing the fluid would be some reduction in the infra-red signature of the typically high temperature jet plume. Further, because the water penetration can be inactivated during flight, during high noise activities, such as takeoff, the water can be made to penetrate deeper into the stream of flow than conventional chevrons, thus potentially reducing even more noise than previously possible.

BRIEF DESCRIPTION OF THE DRAWINGS

The particular features and advantages of the invention as well as other objects will become apparent from the following description taken in connection with the accompanying drawings, which are not necessarily drawn to scale, in which.

DETAILED DESCRIPTION OF THE INVENTION

Figure 1:
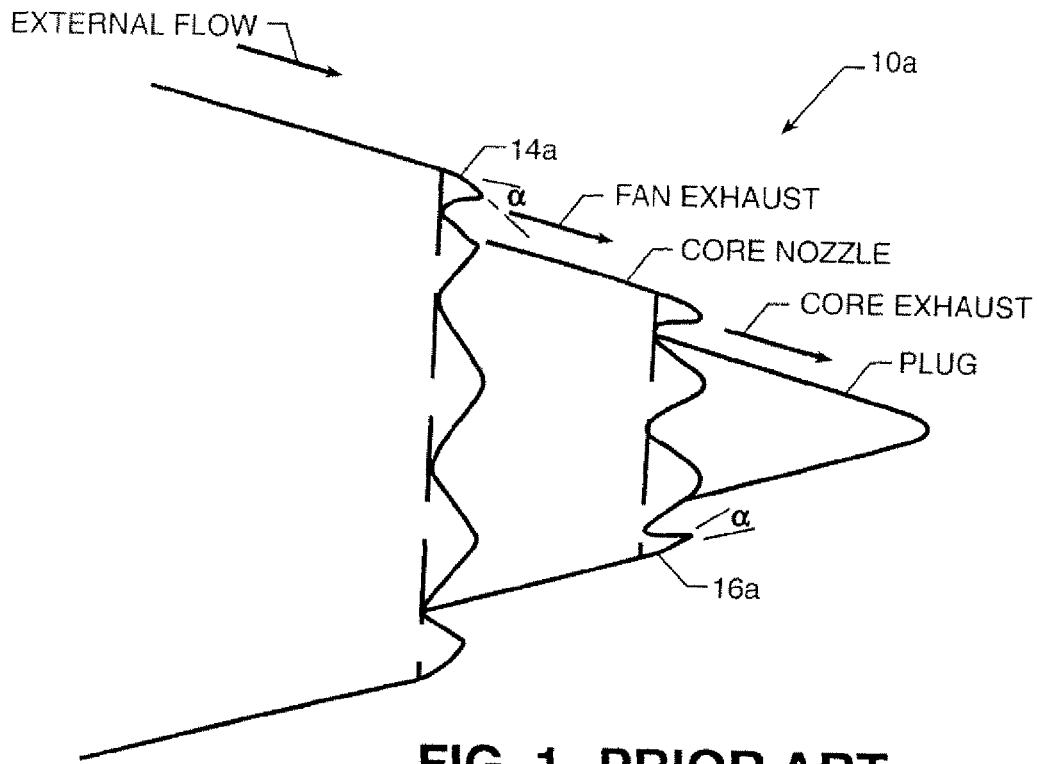
FIG. 1 is a known jet engine design in which mechanically fixed chevrons extend to penetrate into the stream of flow.
Figure 2:
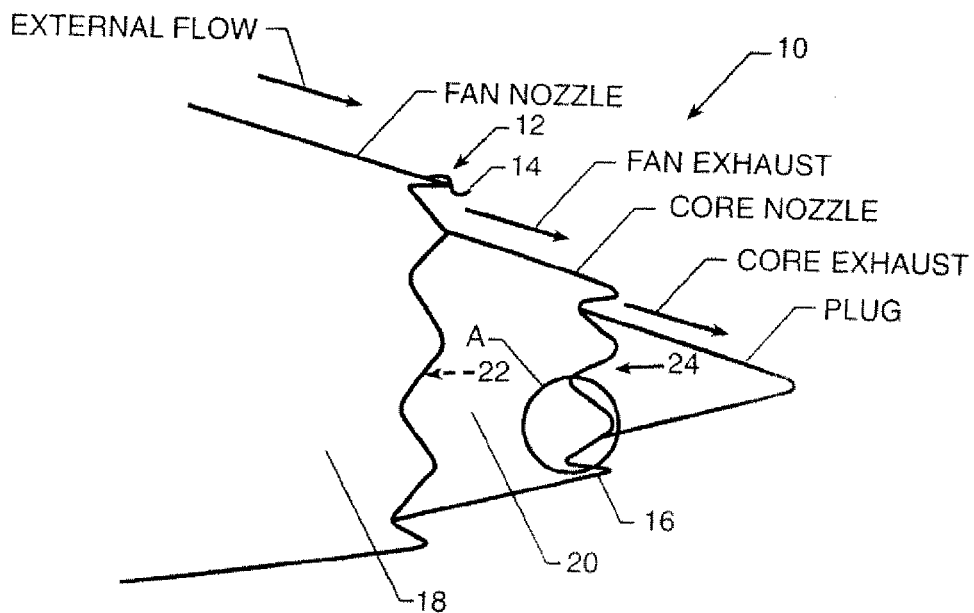
FIG. 2 is a perspective view of an embodiment of the present invention showing fixed chevrons configured not to extend into the stream of flow to the same extent as the known design shown in FIG. 1.

FIG. 1 shows a portion of a known jet engine 10a in which mechanically fixed chevrons, such as chevrons 14a and 16a, extend to penetrate into the stream of flow. FIG. 2 shows a portion of an engine 10 having a noise reduction system 12 constructed in accordance with at least one embodiment of the present invention. In briefly examining FIG. 1 and FIG. 2, there may not appear to be many differences. However, one will see that angle alpha ($\alpha$) exists in FIG. 1 as it relates to an angle that the chevrons, such as chevrons 14a and 16a, are directed into a flow path in this known nozzle design, as compared to the embodiment of the present invention which is depicted in FIG. 2. While this feature (i.e., angling the chevrons into the flow path) has been found to reduce noise at startup, unfortunately, it has also been found to reduce efficiency at cruise speed. Accordingly, as shown in FIG. 2, one can observe that chevrons in accordance with at least one embodiment of the present invention, such as chevron 14 and 16, can be planar, or nearly planar, meaning the material forming them are substantially continuous and co-planar in the direction of flow with the material forming the fan nozzle 18 and the core nozzle 20, respectively. This has not been the ease in the known construction, as shown in FIG. 1, with the angles alpha ($\alpha$) created by the chevrons.

As can be seen in FIG. 2, chevrons such as 14 and 16 can be applied to the fan nozzle 18, the core nozzle 20 or other portions of the engine 10 preferably at the trailing edges 22, 24 of the nozzles 18, 20. This provides the appearance of a "sawtooth" pattern. However, in accordance with at least one embodiment of the present invention, the number of chevrons 14, 16, the shape (e.g., the size and length) of the chevron, the amount of penetration of the chevron into the flow stream (e.g., angle alpha), or other factors can be varied (the construction of which would be understood by one skilled in the art), in previously unconventional ways, to make the chevrons less detrimental to the aircraft's cruise performance. This is possible because, in accordance with the present invention, water is selectively injected at various locations into the stream of flow (as explained more fully below), resulting in the same, or greater, levels of noise reduction with lesser-penetrating (or non-penetrating) fixed chevrons (e.g., the fixed chevrons can be designed to penetrate no more than an amount determined to negligibly degrade engine performance, see FIG. 2). That is to say, the present invention includes an inventive noise reduction system 12 that can be secured and/or reduced at times to increase the efficiency of an engine 10, and thus help the aircraft achieve its maximum performance.

Figure 3:
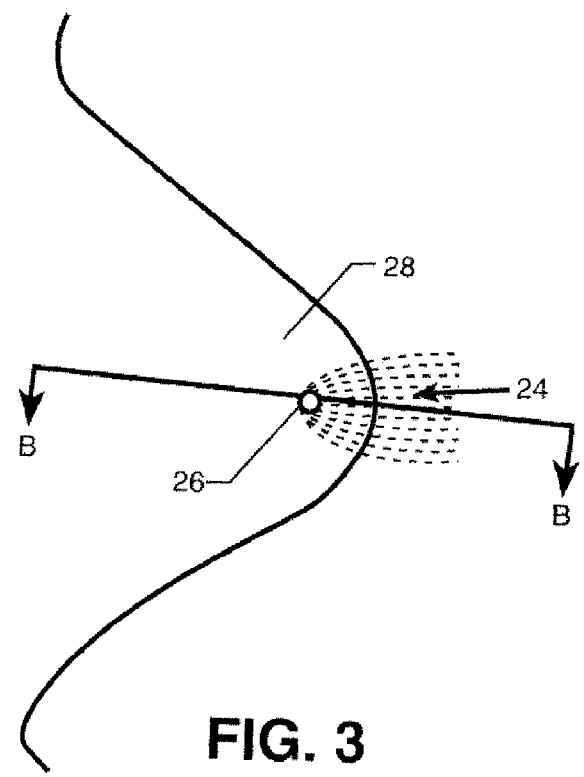
FIG. 3 is a detailed view of the portion identified as A in FIG. 2 from the obscured side as shown in FIG. 2.

FIG. 3 shows the underside of one of the chevrons shown in FIG. 2 which would otherwise be obscured from view in FIG. 2. Specifically, the chevron is located at the trailing edge 24 of the core nozzle 20 (but, for example, could also be applied to the trailing edge of the fan nozzle chevrons). An orifice 26 disposed toward the trailing edge 24 is able to provide somewhat of a "wet chevron" effect when the orifice 26 is utilized as an injector. One or more orifices 26 and/or injectors could be provided in patterns and shapes (i.e., other than circular as illustrated) and angled at various angles relative to inner wall 28 (i.e., other than at the illustrated angle shown in FIG. 4). While it is within the scope of this invention that the actual size of these orifices 26 (and/or injector 30) can vary, however, in one illustrative embodiment relative to an approximately 1/10th of full scale model, these orifices can be circular and have a diameter of 0.05 inches.

Figure 4:
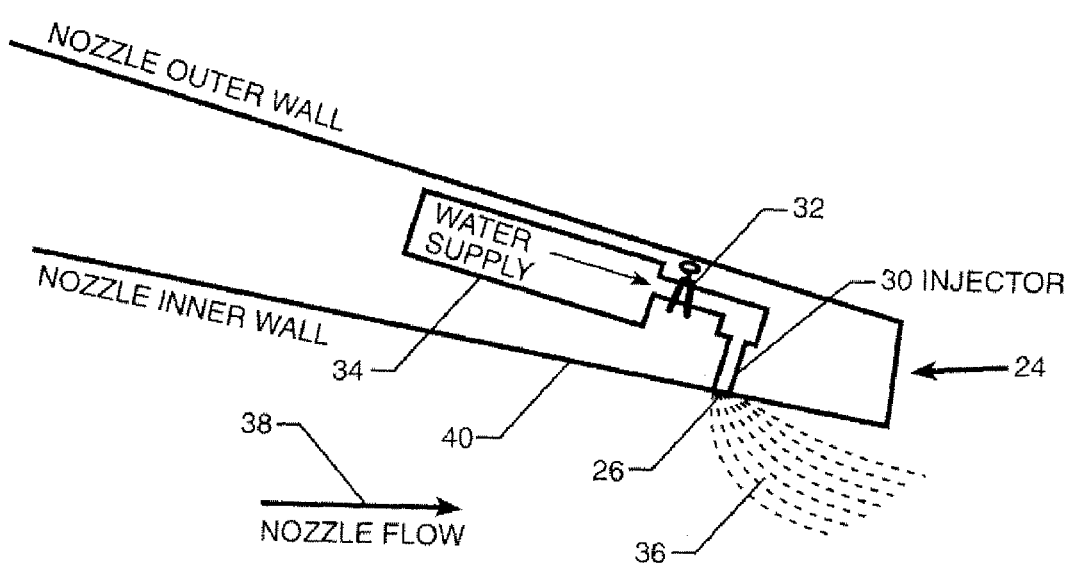
FIG. 4 is a cross-sectional view taken along line B-B of FIG. 3.

Orifice 26 in FIG. 4 is shown terminating at an injector 30 which is operably coupled to a valve such as solenoid contour valve 32 which may be disposed anywhere along the injector 30 and/or supply piping provided thereto. A water supply 34 is illustrated connected to the injector 30 and it is possible that one or more water supplies 34 communicate a supply of water and/or other fluid to one or more of the injectors 30 used by an engine 10 individually, or specific groups of injectors could be selectively activated so as to provide specific patterns of wet chevrons.

As can be seen in FIG. 4, when the injector 30 is activated, a stream of water 36 is injected into the nozzle flow 38. While this is only a single illustrative embodiment of an injector 30, other injector configurations may be disposed closer towards or further from the trailing edge 24.

The injector 30 is shown directing water initially perpendicularly to the orifice 26 and past the inner wall 40. Other relationships could be developed, and in fact, as illustrated, the water stream 36 is essentially immediately directed past the trailing edge 24 due to the force of the nozzle flow 38 when in operation. When one or more valves 32 and/or injectors 30 are secured, the stream of water 36 can be eliminated. This would remove flow obstruction by the water stream 36. Accordingly, increased engine efficiency relative to conventional fixed chevrons with fixed penetration can result during such a status of the injector 30. It would also be possible to regulate the fluid flow from the injector 30 through various other mechanisms which would be known to one skilled in this art.

Referring again to FIG. 2, the engine 10 is illustrated with a dual stream nozzle, namely, a stream of air is provided from the fan nozzle 18 and a second stream of air is provided from the core nozzle 20. By utilizing water to deflect air from one stream into the other stream, mixing between the streams could significantly increase, to result in noise reduction of radiated noise. The injection ports, whether through injectors 30 and/or orifices 26 (FIG. 4), are disposed in specified patterns circumferentially about at least one of the respective nozzles 18, 20 and probably more advantageously around both.

Injection ports in the form of orifices 26 can be sized, oriented, shaped and located to produce substantially the same, or similar, deflection and streamwise (longitudinally) vortices and mixing characteristics as fixed chevrons of the known art. Small jets of fluid at low pressures have been found sufficient to produce the type of water penetration into the flow that can somewhat, if not essentially, duplicate the penetration of conventional chevrons. For example, while the pressure of the injected fluid may be varied to achieve the desired level of flow penetration, however, one potential fluid injection pressure is 1.3% above the exit pressure of the nozzle. Optimization of the technique can also be perfected through altering variables such as the injection angle, injection port shape, water mass flow, and injection port distribution.

In addition to introducing vortices into the flow that enhances jet stream mixing, the water is also believed to provide an additional advantageous noise suppression by mixing with the jet plume downstream to reduce turbulent pressure and temperature fluctuations that cause far-field noise radiation. This is believed to occur by water droplets, when in operation, disbursing through the exhaust to reduce gas temperature caused by latent heat effects and attenuation of turbulent, kinetic and thermal energies. These effects have been found to reduce pressure and temperature fluctuation in the noise producing portion of a jet engine.

By selectively providing the ability to inject or not inject the water stream 36 into the flows 38 as illustrated, water or other fluid can be selectively injected for maximum noise reduction only in high noise operations, such as during take-off. This could mean that during cruise, there could be less penalty, or no penalty, due to a loss of thrust when the system is secured. Also, because the water can be secured, or at least reduced, at cruise, the wet chevrons can be designed for more aggressive noise reduction than conventional fixed geometry chevrons that are normally limited by a cruise thrust penalty. Additionally, while the innovation requires water or other fluid to be stowed in the aircraft, the water may be expended in the first few minutes of flight and thereby only a minimal weight penalty may be associated with plumbing. This innovation represents a major advantage because mechanical maintenance requirements, as well as initial costs, can be lower than those associated with other noise reduction methods. Furthermore, the relative simplicity of this innovation may make it possible to retrofit existing engines at relatively low cost. Therefore, it is within the scope of the present invention to utilize conventional fixed chevrons as well. However, for the reasons described herein, peak performance is believed to occur by the use of the inventive non-penetrating, or low penetrating, fixed chevron constructions (as illustrated in FIG. 2) with the selective noise reduction.

Figure 5:
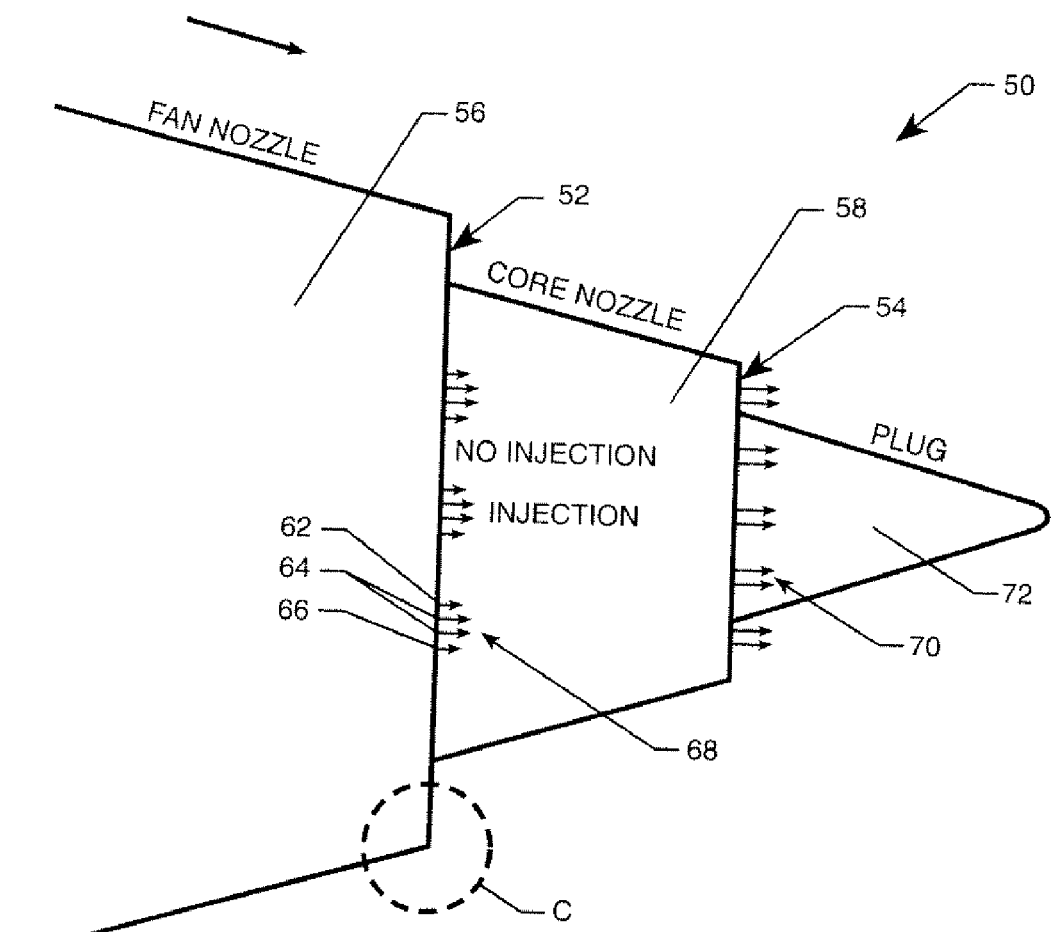
FIG. 5 is a perspective view of a another possible embodiment of the present invention.
Figure 6:
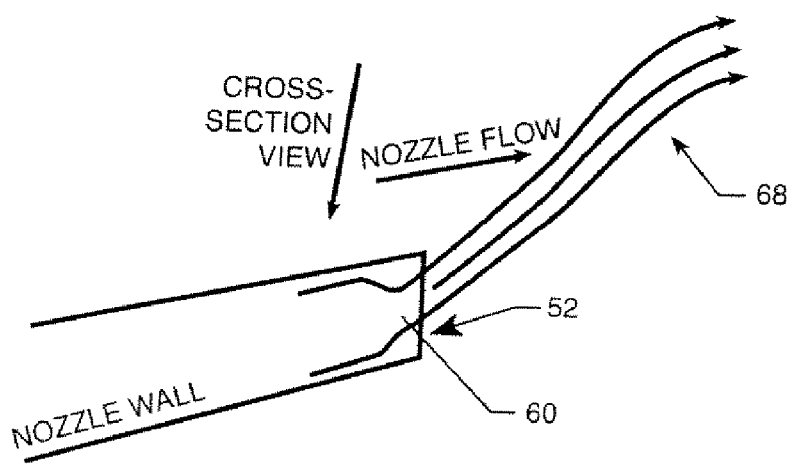
FIG. 6 is a cross-sectional view of the detailed area C shown in FIG. 5.

FIG. 5 shows an alternative advantageous embodiment which shows an engine 50 which lacks chevrons at its trailing edges 52, 54 of its fan nozzle 56 and core nozzle 58 respectively. Instead, multiple orifices, for example slots, are disposed proximate, if not at, the trailing edges 52, 54. Injection patterns with an angled injection port 60 are shown in FIG. 6. Of course, this type injection port 60 could be utilized in the embodiment shown in FIG. 2 as well, and further embodiments could be constructed using the technology shown herein. Multiple adjacent slots 62, 64 and/or 66, and still others, can be utilized in conjunction with one another to provide a desired flow stream 68 (a "water chevron") as shown in FIGS. 5 and 6. In fact, more than one flow stream, 68, 70 can be provided from respective nozzles 56, 58. The injection ports 60 may be provided in a periodic and/or non-periodic distribution at the respective trailing edge 52, 54. Furthermore, streams 68 and 70 may be similarly or differently configured to that shown in FIG. 5, and ducting could even be located external to one or more of the nozzle walls.

Plug 72 is illustrated at the end of the engines 50 and 10. Other embodiments may or may not have a plug 72.

Numerous alterations of the structure herein disclosed will suggest themselves to those skilled in the art. However, it is to be understood that the present disclosure relates to advantageous embodiments of the invention which are for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A jet noise reduction system for use with a jet engine, said jet engine having a first nozzle with a trailing edge, said system comprising:
   a fluid supply;
   an injector operably coupled to an orifice proximate to the trailing edge of the first nozzle;
   said jet noise reduction system having at least a first configuration in which said fluid supply is in fluid communication with said injector and said orifice to thereby direct a stream of fluid with a momentum into a first flow stream from the engine, prior to the trailing edge of the first nozzle, to thereby direct the stream of fluid past the trailing edge due to the force of flow through the first nozzle; and
   wherein mechanically fixed chevrons are disposed circumferentially at the trailing edge of the first nozzle.

2. The jet noise reduction system of claim 1 further comprising a second configuration in which a flow rate of said stream of fluid is at least partially reduced.

3. The jet noise reduction system of claim 2 wherein when said jet noise reduction system is in the second configuration said jet noise reduction system reduces the efficiency of the engine less than 0.1% or essentially no measurable loss.

4. The jet noise reduction system of claim 1 further comprising a plurality of orifices proximate to the trailing edge of the first nozzle, each directing a stream of fluid with a momentum at least partially into the flow stream from the engine.

5. The jet noise reduction system of claim 4 wherein the plurality of orifices are disposed at least substantially uniformly or non-uniformly circumferentially relative to the trailing edge of the first nozzle.

6. The jet noise reduction system of claim 4 further comprising a plurality of injectors, each of said injectors being operatively coupled to at least one orifice.

7. The jet noise reduction system of claim 1 further comprising a plurality of injectors, each of said plurality of injectors disposed at least substantially circumferentially relative to the trailing edge of the first nozzle.

8. The jet noise reduction system claim 1 wherein said orifice is located along the trailing edge of the first nozzle and said injector directs the fluid at an angle into the at least one flow stream from the engine.

9. The jet noise reduction system of claim 1 wherein said orifice is located on an interior nozzle wall and is spaced from the trailing edge of the nozzle.

10. The jet noise reduction system of claim 1 in use with a jet engine having a second nozzle with a trailing edge, concentrically disposed relative to the first nozzle, said system further comprising:
an injector operably coupled to an orifice proximate to the trailing edge of the second nozzle:
said jet noise reduction system having at least a third configuration in which said fluid supply is in fluid communication with said injector and said orifice associated with the second nozzle thereby directing a stream of fluid with a momentum at least partially into a second flow stream from the engine.

11. The jet noise reduction system of claim 10 wherein the stream of fluid directed into the second flow stream has a different pattern than the stream of fluid directed into the first flow stream.

12. The jet noise reduction system of claim 10 wherein said fluid supply is a water supply.

13. The jet noise reduction system of claim 10, wherein mechanically fixed chevrons are disposed circumferentially at the trailing edge of at least one of the first and the second nozzles.

14. The jet noise reduction system of claim 13, wherein said mechanically fixed chevrons are shaped and positioned so as to not substantially penetrate into the flow stream from at least one of the first nozzle and the second nozzle.

15. The jet noise reduction system of claim 10 wherein said fluid supply comprises multiple sub-supplies, wherein each sub-supply is coupled to at least one orifice.

16. The jet noise reduction system of claim 1 wherein said fluid supply is a water supply.

17. A jet noise reduction system for use with a jet engine, said jet engine having a first nozzle and a second nozzle each having a trailing edge at an end of a respective inner wall, said system comprising:
at least one first fluid supply;
a first plurality of orifices operably coupled to at least one first fluid supply and disposed proximate to the trailing edge of the first nozzle;
wherein when in a first configuration said fluid supply is in fluid communication with the orifices thereby directing streams of fluid with momentum beyond the inner wall and at least partially into a first flow stream from the engine, prior to the trailing edge of the first nozzle, to thereby direct the stream of fluid past the trailing edge due to the force of flow through the first nozzle;
a second plurality of orifices operably coupled to at least one second fluid supply and disposed proximate to the trailing edge of the second nozzle;
wherein when in a second configuration said at least one second fluid supply is in fluid communication with said second plurality of orifices thereby directing streams of fluid with momentum beyond the inner wall of the second nozzle and at least partially into a second flow stream from the engine; and
wherein said orifices disposed on at least one of the first and second nozzles are spaced a distance along the inner wall from the trailing edge; and
wherein the trailing edges of at least one of the first and the second nozzle has a plurality of mechanically fixed chevrons.

18. The jet noise reduction system of claim 17 further comprising a third configuration in which flow rates of said streams of fluid are reduced relative to at least one of the first and second nozzles.

19. The jet noise reduction system of claim 18 wherein when in the third configuration, flow rates of said streams of fluid to both the first and second nozzles are reduced.

20. The jet noise reduction system of claim 17 wherein said plurality of chevrons creates a sawtooth pattern.

21. The jet noise reduction system of claim 17 wherein said orifices disposed on at least one of the first and second nozzles are spaced a distance along the inner wall from the trailing edge.

22. The jet noise reduction system of claim 17, wherein said chevrons of the at least one of the first and the second nozzle are positioned in the direction of flow so as to not substantially penetrate into the flow streams from the second nozzles.

23. A jet noise reduction system for use with a jet engine, said jet engine having a first nozzle with a trailing edge, said system comprising:
a fluid supply;
an injector operably coupled to an orifice proximate to the trailing edge of the first nozzle;
said jet noise reduction system having at least a first configuration in which said fluid supply is in fluid communication with said injector and said orifice to thereby direct a stream of fluid with a momentum into a first flow stream from the engine, prior to the trailing edge of the first nozzle, to thereby direct the stream of fluid past the trailing edge due to the force of flow through the first nozzle;
wherein said fluid supply is a water supply.

* * * * *